US006441590B1

(12) United States Patent
Amantea et al.

(10) Patent No.: US 6,441,590 B1
(45) Date of Patent: Aug. 27, 2002

(54) TWO STAGE ARCHITECTURE FOR A MONITOR POWER SUPPLY

(75) Inventors: Robert Amantea, Manalapan; Timothy Allen Pletcher, Eastampton, both of NJ (US); Jae-Hong Joo, Kyunngi-Do; Min-Sung Yang, Seoul, both of (KR)

(73) Assignees: Sarnoff Corporation, Princeton, NJ (US); Daewoo Electronics Co., Ltd., Seoul (KR)

( * ) Notice: Subject to any disclaimer, the term of this patent is extended or adjusted under 35 U.S.C. 154(b) by 0 days.

(21) Appl. No.: 09/515,304

(22) Filed: Feb. 29, 2000

Related U.S. Application Data
(60) Provisional application No. 60/126,525, filed on Mar. 26, 1999.

(51) Int. Cl.[7] .................................................. G05F 1/40
(52) U.S. Cl. ....................... 323/266; 323/267; 315/411; 307/75; 307/30; 345/212; 713/324
(58) Field of Search .............................. 307/28, 75, 38, 307/39, 29, 72; 323/902, 266, 267; 345/204, 211–213; 315/411; 713/324

(56) References Cited

U.S. PATENT DOCUMENTS

| | | | | |
|---|---|---|---|---|
| 5,013,980 A | * | 5/1991 | Stephens et al. ............ | 315/411 |
| 5,036,261 A | * | 7/1991 | Testin ......................... | 315/411 |
| 5,184,025 A | * | 2/1993 | McCurry et al. ............ | 363/65 |
| 5,341,179 A |   | 8/1994 | Konishi |   |
| 5,442,534 A | * | 8/1995 | Cuk et al. .................... | 363/16 |
| 5,453,921 A | * | 9/1995 | Schutts ........................ | 363/21 |
| 5,726,871 A | * | 3/1998 | Choi ........................... | 323/207 |
| 5,905,491 A | * | 5/1999 | Kim ............................ | 363/41 |
| 6,061,253 A | * | 5/2000 | Igarashi et al. .............. | 363/19 |
| 6,157,168 A | * | 12/2000 | Malik ......................... | 307/66 |
| 6,157,549 A | * | 12/2000 | Nath .......................... | 348/730 |
| 6,222,742 B1 | * | 4/2001 | Schlecht ..................... | 363/16 |
| 6,229,724 B1 | * | 5/2001 | Virtanen .................... | 363/89 |

FOREIGN PATENT DOCUMENTS

EP          0491074          6/1992

* cited by examiner

*Primary Examiner*—Jessica Han
*Assistant Examiner*—Gary L. Laxton
(74) *Attorney, Agent, or Firm*—William J. Burke

(57) ABSTRACT

A power supply according to the principles of the inventions comprises two stages. The first stage is a power factor corrector stage. This stage provides the required line regulation, including greater than 95% power factor correction, and provides a range of outputs from approximately 5 volts to 200 volts with good load regulation at low voltages. The second stage is a soft switching power supply having good load regulation from approximately 40 to approximately 175 volts. An intermediate high voltage of the first stage supplies the input to the second stage, thereby achieving extremely good line regulation and low regulation.

17 Claims, 5 Drawing Sheets

TWO STAGE ARCHITECTURE FOR A MONITOR POWER SUPPLY

This Application claims the benefit of U.S. Provisional Application Ser. No. 60/126,525 filed Mar. 26, 1999.

FIELD OF THE INVENTION

The invention relates generally to power supplies for electronic devices and more particularly to two stage power supplies for monitors.

BACKGROUND

The advances in personal computer technology has fueled an increase in demand for personal computers. A critical component of the personal computer is the computer monitor. The anticipated increase in the use of computer monitors has resulted in a stringent set of design requirements that has not been achieved in known monitor systems. For example, computer monitors should operate from line voltages of approximately 90 to 260 volts RMS, while still providing multi-mode operation. A power supply for such a monitor should operate from 110 volt or 220 volt line voltages and provide output voltages from approximately 5 to approximately 175 volts. Due to environmental emission regulations, such a power supply would also be required to achieve power factor correction of greater than 95%.

These requirements cannot be achieved cost effectively using known power supply architectures. The wide range of output voltages results in a low volts-per-turn requirement on the power supply transformer. This leads to a large number of turns in the high voltage windings, and, therefore, increased losses in the transformer windings. Linear regulators are sometimes used on low voltage outputs to address the problem of a high a volts-per-turn requirement on a transformer. This solution, however, increases cost and reduces efficiency.

The efficiency requirements are typically addressed with a soft-switching type power supply; however, such supplies do not operate well over a wide range of input voltages. The soft switcher requires an input voltage limitation so that the resonator and associated "soft switching" circuitry will operate in the lowest noise, most efficient manner. Soft switchers typically have a minimum power output capability while operating in full power mode. Typical multi-mode monitor requirements include an intermediate, low power (i.e. 20W) mode of operation known as the Suspend or Standby mode. This requirement is typically below the minimum load where optimum efficiency and performance can be achieved for the typical soft switching power supply.

SUMMARY OF THE INVENTION

A power supply according to the principles of the invention meets several contradictory power supply requirements. An exemplary power supply operates from approximately 90 to 260 volts RMS, while providing high efficiency over a wide load range. A power supply according to the principles of the invention also achieves good line regulation and load regulation and provides multiple outputs from, for example, 5 to 175 volts, while achieving power factor correction of greater than 95% with low ripple. Such an exemplary power supply can achieve these requirements without use of linear regulators on the voltage outputs, although linear regulators can be used if required.

A power supply according to the principle of the inventions comprises two stages. The first stage is a power factor corrector stage. This stage provides the required line regulation, including high (such as greater than 95%) power factor correction, and provides a range of outputs from approximately 5 volts to 200 volts with good load regulation at the low voltages. The second stage is a soft switching power supply having good load regulation from approximately 40 to approximately 200 volts. As typical for soft switching power supplies, the second stage exhibits extremely high efficiency. An intermediate high voltage of the first stage (a voltage between the highest line voltage and highest output voltage) supplies the input to the second stage. The power supply thereby achieves both good line regulation and good load regulation over all outputs.

This exemplary two-stage power supply is adaptable for use in a multi-mode computer monitor or television. Since the first stage provides good power regulation at low voltages, the first stage and the second stage can be partitioned for a three-mode supply. In a suspend mode, the low voltages in the first stage can provide the "always-on" voltages typically required of monitors. These voltages, which range from 5 in an off mode to 15 volts in a standby mode, provide power to the microprocessors, microcontrollers, and remote control circuitry as required. The high voltages on the secondary are unloaded during the suspend mode (no picture), thereby reducing the feedback requirements. A reduction in feedback requirements also reduces the feedback components, such as optoisolators, and, therefore, the relative cost of the power supply.

BRIEF DESCRIPTION OF THE DRAWINGS

A more complete understanding of the invention may be obtained from consideration of the following description in conjunction with the drawings in which.

DETAILED DESCRIPTION

Figure 1:
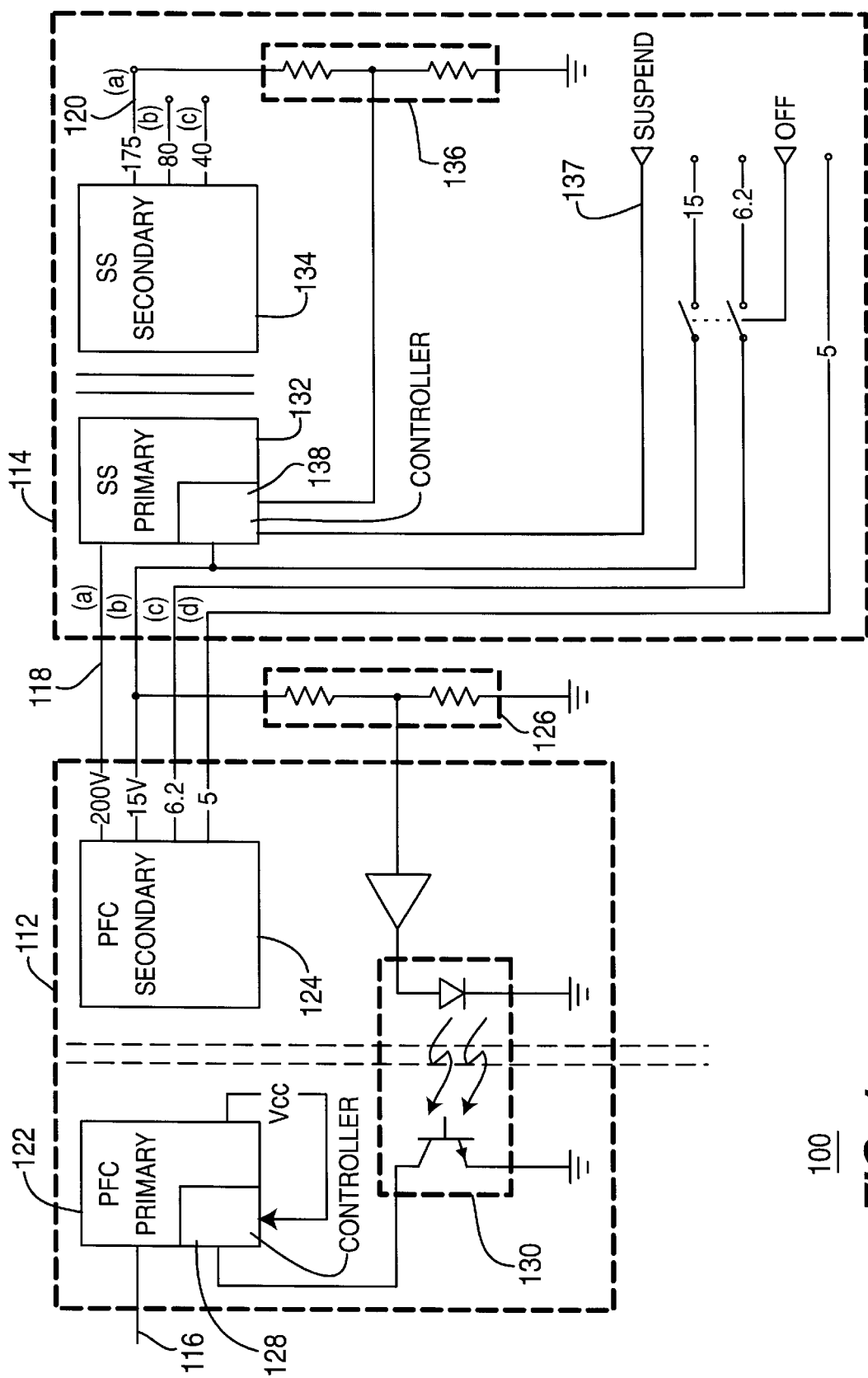
FIG. 1 shows a block diagram of a power supply according to the principles of the invention.

A power supply according to the principles of the invention is shown in FIG. 1. This exemplary power supply 100 includes two stages: a power factor corrector stage 112 and a load regulator stage 114. The power factor corrector stage 112 operates from a line voltage 116 and provides multiple output voltages also referred to as first stage voltages 118(a–d). These output voltages include a high voltage 118(a) and a set of low voltages 118(b, c, d). In this exemplary configuration, the high voltage 118(a) is a voltage of intermediate magnitude and provides the input voltage to the load regulator stage 114. This intermediate value is a value between the highest line voltage and the highest output voltage. The low set of voltages 118(b, c, d) can be used to supply a load where load regulation is not a stringent criteria. The load regulator stage 114 provides multiple, well regulated output voltages also referred to as second stage voltages 120(a–c).

The power factor corrector stage 112 includes a power factor corrector primary 122 and a power factor corrector secondary 124. The power factor corrector secondary 124 provides the output voltages 118(*a–d*). A feedback voltage divider 126 provides a feedback voltage proportional to one of the voltages 118(*b*) from the set of low voltages. The power factor corrector primary 122 includes a controller 128 for regulating the output voltages 118. An optoisolator 130 couples the feedback voltage to the controller 128, thereby isolating the power factor corrector primary 122 and secondary 124.

The load regulator stage 114 is a soft-switching power supply operating in voltage mode control, although alternative control schemes, such as current mode control, are applicable. The load regulator stage 114 includes a primary 132 and a secondary 134. The secondary 134 provides three regulated output voltages 120(*a–c*) and a voltage divider 136 develops an output voltage feedback from one of the three regulated output voltages. In this exemplary power supply 100, the regulated output voltage of highest magnitude 120(*a*) provides the input to the voltage divider 136 to maximize regulation of the high voltage requirements (the picture is on). These high voltage requirements include the run mode voltage. A controller 138 provides feedback control for the second stage.

The partition of voltages is selected to provide the low voltage requirements of the monitor, such as in suspend mode. As is known, suspend mode only requires power to the "always-on" circuitry; the picture is off. In this configuration, the power factor corrector provides the suspend mode voltage and the load regulator stage 114 can be turned off without affecting the low voltage requirements. The SUSPEND signal 137 signals the second stage controller that the power supply is operating in suspend mode.

This power supply configuration reduces the volts-per-turn ratios for the transformer secondary (not shown) in the load regulator 114. For the power factor corrector 112, the transformer secondary's volts-per-turn ratio is the ratio of the highest voltage 118(*b*) in the low voltage set 118(*b–d*) and the lowest voltage 118(*d*) of the set. For the load regulator 114, the ratio is the highest voltage 120(*a*) to the lowest voltage 120(*c*). Thus, the volts-per-turn ratio for the load regulator transformer secondary will be significantly larger than in a single stage supply. This minimizes the need for linear regulators.

Figure 2:
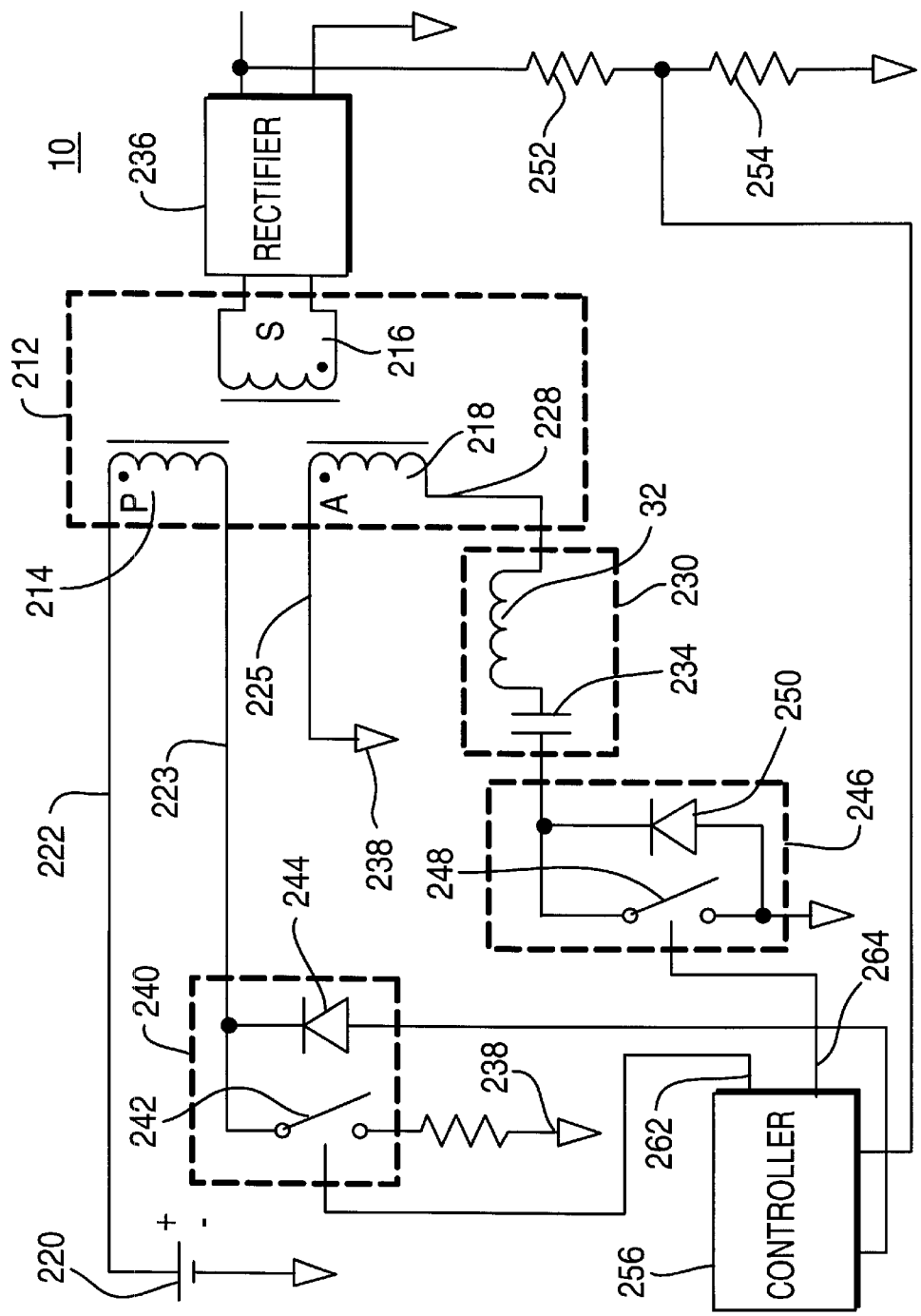
FIG. 2 shows a second stage according to the principles of the invention.

The load regulator should be selected to provide good load regulation and efficiency over the range of output voltages. Soft-switching topologies are known to meet these requirements. FIG. 2 shows one soft-switching topology that can be used in the architecture of FIG. 1. It should be apparent to one of ordinary skill in the art that various components and component values can be used in this topology without departing from the principles of the invention. This switcher topology 210 includes a transformer 212 having primary 214, auxiliary 218 and secondary 216 windings. One leg of the primary winding 222 is coupled to a first voltage 220. The other leg is connected in series with a primary switch network 240, which in turn couples to ground 238 through a resistor 239. The auxiliary winding 218 has a first leg 225 coupled to ground 238 and a second leg 228 coupled in series with a resonator 230. The resonator 230 couples to an auxiliary switch network 246. The secondary 231 includes the transformer secondary 216 and an output rectifier 236 for providing a regulated DC voltage.

The primary switch network 240 includes a primary switch 242 coupled in parallel with a primary commutation diode 244. The auxiliary switch network 246 includes an auxiliary switch 248 in parallel with an auxiliary commutation diode 250. These switch networks 240 and 246 control the current through the primary and auxiliary windings, respectively. The primary commutation diode 244 clamps the primary switch 242 voltage to zero when the primary switch 242 is closed and provides a primary current signal to a controller 256. The controller 256 in turn provides switching control signals at its outputs 262 and 264, which control the primary switch 242 and the auxiliary switch 248, respectively. The resonator 230, an LC (232, 234) circuit, forces the voltage in the auxiliary switch 248 and the current in the primary switch 242 to desired levels during on-off transitions. As is known in the art, the primary and auxiliary switches 242 and 248 can be transistors or other switching devices. Scaling resistors 252 and 254 provide a scaled DC output voltage which feeds back to the controller 256. The soft switcher stage of the power supply can use a transformer having bifilar windings to provide closer coupling between the primary 14 and auxiliary 18, and to reduce eddy current losses.

Figure 3:
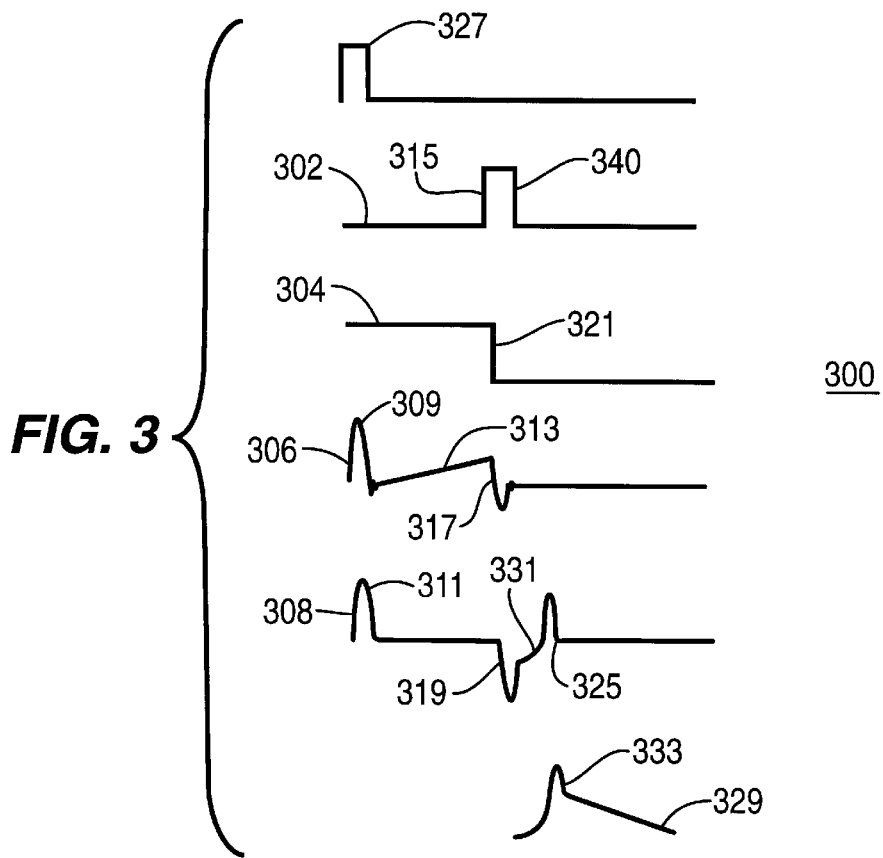
FIG. 3 shows timing diagrams for the exemplary second stage shown in FIG. 2.

Operation of this exemplary soft-switcher stage is explained with reference to the timing diagrams of FIG. 3 as well as to FIG. 2. The switching cycle 300 begins with the closing of the primary switch 242. The auxiliary control signal 302 is low (the auxiliary switch 248 is open) and the primary control signal 304 is high. Current at a frequency set by the resonator 230 flows in the primary 214 and auxiliary 218 windings, until the resonant capacitor 234 stores a voltage equal to the voltage across the auxiliary winding 218. When these voltages are equal, the resonant current ceases to flow in either winding (there is no difference in potential to induce current flow). In the timing diagrams, this is illustrated by the half-cycle waves in the primary current wave diagram 306 and the auxiliary current wave diagram 308, at 309 and 311 respectively.

Once the resonant current terminates, the primary current climbs, as at 313, until terminated by the controller 256 in response to a feedback signal. Rather than terminate the primary current immediately, however, the controller 256 closes the auxiliary switch 248 (the control signal goes high, as at 315), causing the primary current and the auxiliary current to flow at the resonant frequency in the primary 214 and auxiliary windings 218, respectively. This drives these currents in a negative direction, as at 317 and 319 respectively. If the amplitude of the resonant current is high enough, the polarity of the current flowing in the primary switch 242 changes from positive to negative and the primary commutating diode 244 clamps the voltage across the switch 242 to zero (not shown) when the primary switch 242 is off. When the auxiliary switch current amplitude is less than the primary switch current, the converter acts as a partial soft switcher.

The auxiliary switch 248 remains on, as at 323, and the auxiliary continues to conduct current as the transformer develops a flyback voltage set by the secondary voltage. In other words, upon the opening of the primary switch 242, as at 321, the energy stored in the transformer 12 causes current to flow in the secondary winding 216. The auxiliary current polarity switches, as at 331, and the current rises until the voltage across the secondary winding 216 is clamped to the output voltage, as shown, in the secondary current wave diagram 329, at 333. The capacitor 34 discharges into the load at a resonant frequency determined by the LC network 230 and any leakage inductance and capacitance between the auxiliary and secondary windings. When the auxiliary current crosses zero, as at 325, the auxiliary commutating diode clamps the auxiliary switch 248 to zero voltage and the auxiliary switch 248 is off, as at 340.

Figure 4:
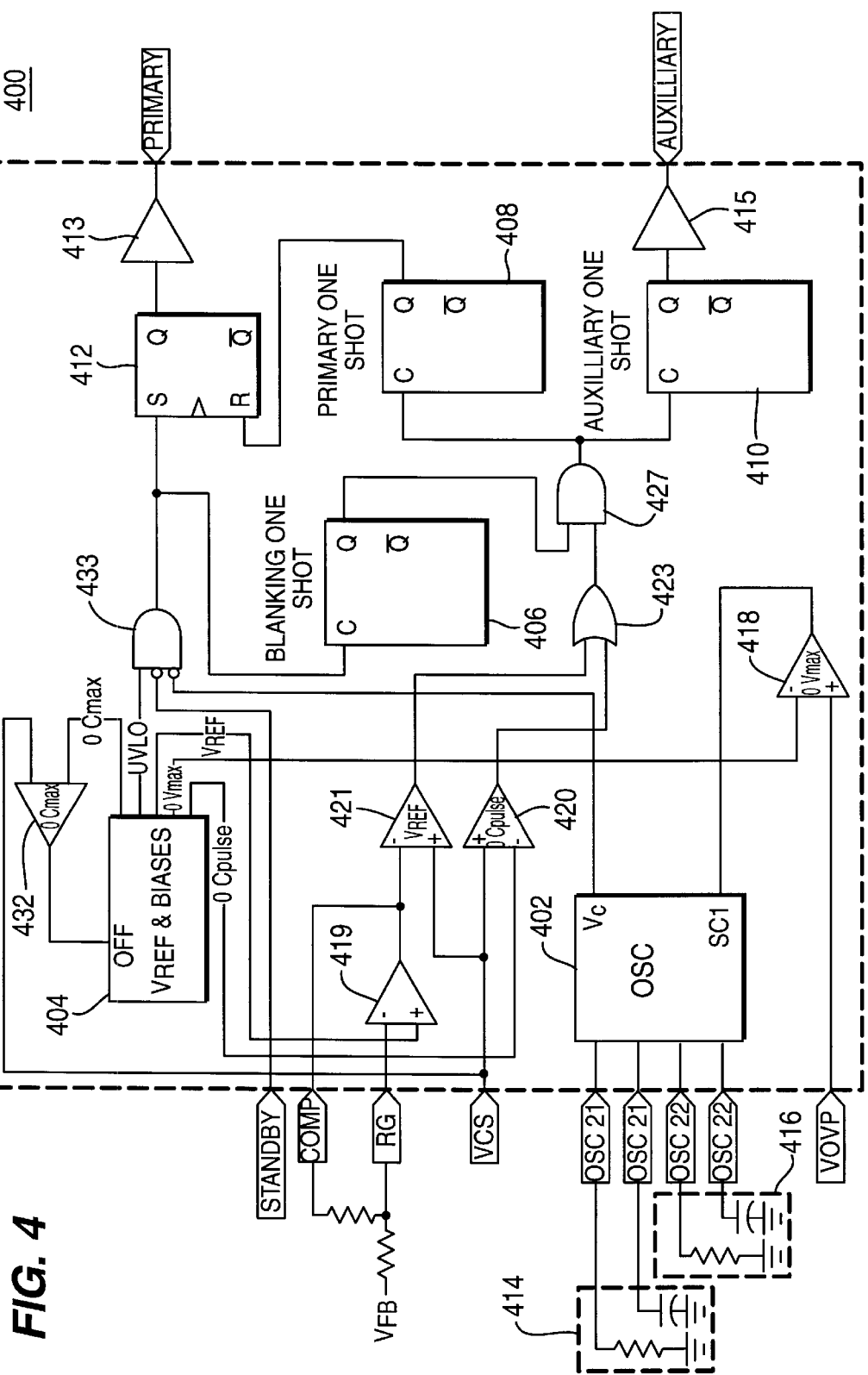
FIG. 4 shows a controller for controlling the second stage of FIG. 2.

Referring now to FIG. 4 and to FIG. 1, an exemplary current mode controller 400 operable to control switching according to the principles of the invention is shown. The controller 400 implements PWM current mode control and pulse-by-pulse over-current protection. It comprises a programmable oscillator 402 for providing a common time base for the primary and auxiliary switch control. A voltage reference, bias generator 404 develops an internal temperature compensated voltage reference and an under voltage lock out signal (UVLO) that inhibits operation until the voltage reference is stable. UVLO drives an AND gate 433 which sets an RS flip-flop 412. A blanking pulse one shot 406, a primary switching signal one shot 408, an auxiliary switching signal one shot 410, and the RS flip-flop 412 implement the current control and develop the switch control signals. Buffers 413 and 415 buffer the blanking pulse one shot 406 output and the auxiliary one shot 410 output, respectively.

The oscillator 402 consists of two oscillators programmable with RC networks 414 and 416. One oscillator is programmed for the switching frequency and the other for some fraction of the switching frequency. The reduced frequency operation provides low power operation, such as in a standby mode for monitors. A comparator 418 controls selection of the oscillator frequency based upon an over voltage signal (VOVP) or the STANDBY signal. The comparator 418 has hysterisis so that no oscillations occur if VOVP is present.

The oscillator 402 output sets the timing for the one shot devices (406, 408 and 410) and the flip-flop 412. The initial rising transition of the oscillator 402 activates the primary switch 42 and forms a blanking pulse with the blanking pulse one shot 406. This prevents premature termination of the primary switch and overrides the over-current condition when the resonant pulse is active. As is known in the art, the blanking pulse width is programmable with the one shot 406. The timing of the blanking pulse in relation to the switch cycle is shown in FIG. 3, at 327.

When the blanking pulse terminates, the controller implements PWM control and over-current sensing. The current sense signal, VCS, is a voltage developed from the current in the primary switch 42. When VCS exceeds the magnitude of an error voltage, the PWM comparator 421 generates a pulse activating the auxiliary one shot 410 and the primary one shot 408. An Error Amplifier 419 compares a feedback voltage to a reference voltage, Vref, and drives the PWM comparator 421. This activates switching for the primary 42 and auxiliary 48 switches; however, the primary one shot 408 delays switching for approximately one quarter of a resonant cycle.

If an overcurrent condition exists, the OC Pulse comparator 420 generates a pulse, activating the auxiliary one shot 410 and the primary one shot 408. This condition usually occurs during power supply start-up. An OR gate 423 drives an AND gate 427 (with a non-inverting input) in response to the OC Pulse comparator 420 and the PWM comparator 421. The AND gate 427 is also responsive to the blanking pulse one shot 412, and it 427 drives the primary one shot 408 and auxiliary one shot 410.

For catastrophic over-current protection, VCS is compared to a fixed voltage generated in the voltage reference generator 404. The OC Max comparator 432 turns off the reference generator, disabling the controller 400, when the over-current voltage threshold is exceeded.

The power factor corrector should be selected to provide near unity power factor with good line regulation and good load regulation for the set of low voltages. A zero voltage switching topology can be used to provide the required low voltage regulation and noise requirements. An optoisolator in the feedback loop provides further isolation between the power factor corrector primary and secondary. Control of the power factor corrector can be any controller suitable to provide good line regulation and good low voltage load regulation while achieving high power factor correction (for example, over 95%). Suitable for performing this function are preregulators manufactured by Unitrode Integrated Circuits Corporation, such as its UC 1852, 1853 and 1854 families.

Figure 5:
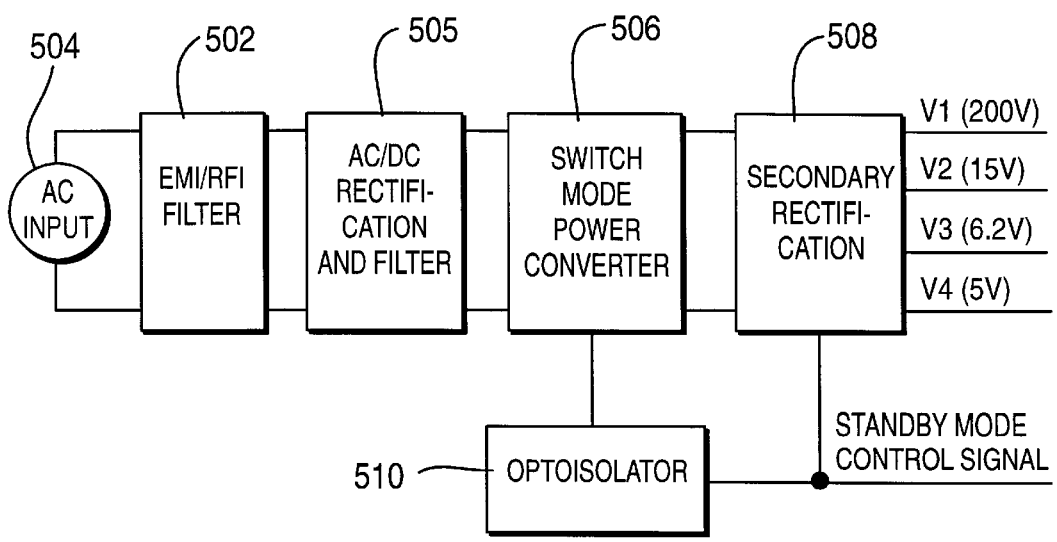
FIG. 5 shows a block diagram for an exemplary power factor corrector stage according to the principles of the invention.

A block diagram for an exemplary power factor corrector is shown in FIG. 5. This power factor corrector 500 includes an EMI/RFI filter 502 between the line voltage 504 and the AC/DC Rectifier and Filter 505. The rectified and filtered input voltage is processed by a Switch Mode Power Converter 506 before rectification by the Secondary Rectifier 508. An optoisolator 510 provides isolation between the Secondary Rectifier 508 and the converter 506.

Figure 6:
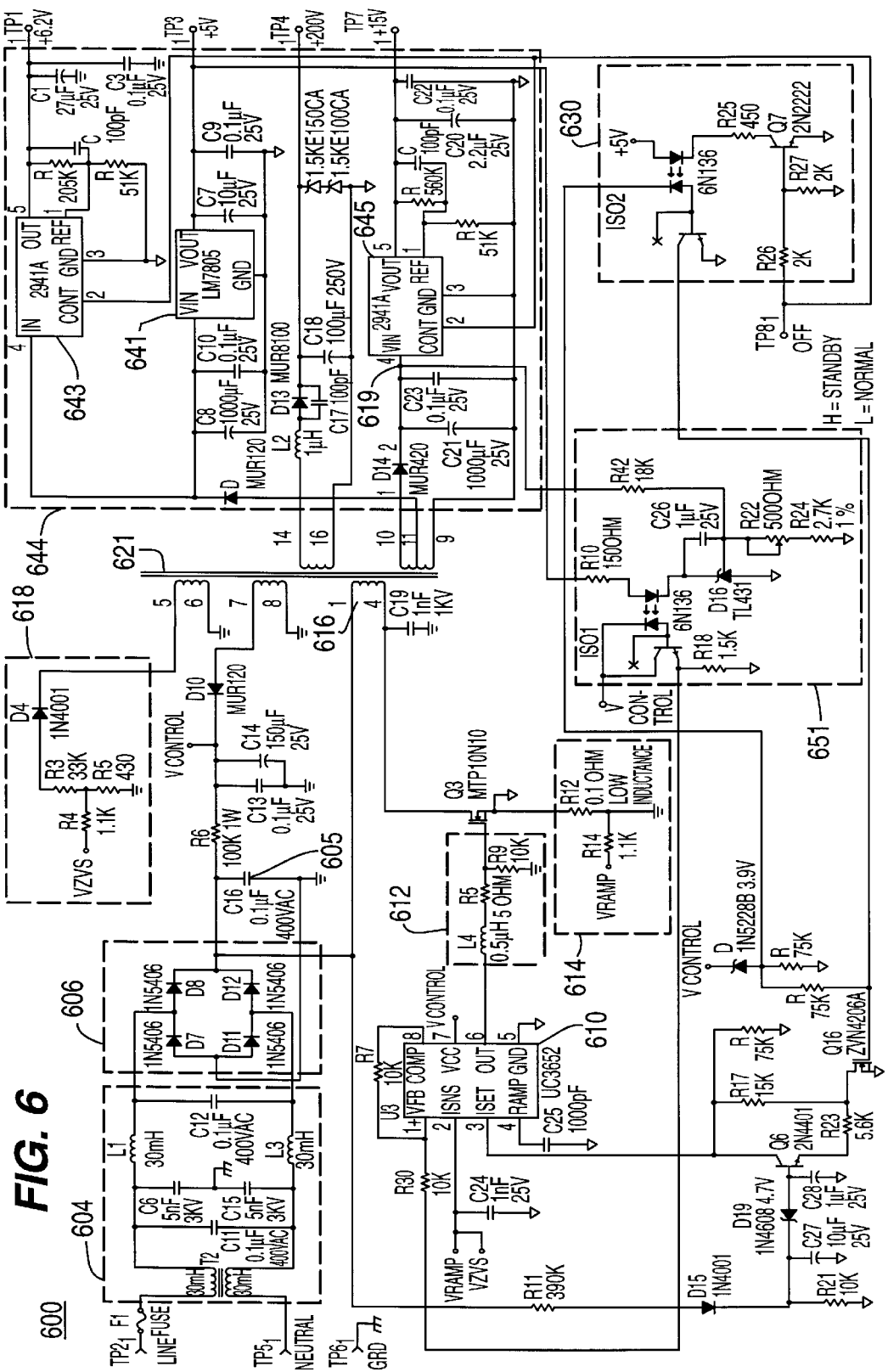
FIG. 6 shows another exemplary power factor corrector stage.

FIG. 6 shows an exemplary power factor corrector 600 according to the principles of the invention. The line voltage is filtered by the EMI/RFI filter 604. This filter 604 is a two stage LC common mode filter. Each stage should has a cutoff frequency in the frequency band between 4 kHz and 10 kHz (6 kHz in this embodiment). The filter achieves 80 dB of attenuation at a switching frequency of 40 kHz, which is suitable for a line voltage of 120 volts AC. Due to the high attenuation characteristics of this filter, the value of the input filter capacitor 605 following the input rectifier 606 can be lowered without conducting unwanted signals back into the AC line. This permits high power factor correction capability.

The power conversion and control stage employs a quasi-resonant, zero voltage switching (QRS-ZVS), flyback topology. The controller 610 is the Unitrode Corp. UC 3852, although it should be apparent that other controllers can be used without departing from the principles of the invention. In this application, the controller 610 provides a switch control signal to the power switch 612. The switch control is developed from the combination of two signals. A first network 614 develops a signal proportional to the current flowing in the primary winding 616. A second network 618 develops a signal from a half-wave rectified winding voltage wired in the same polarity as the primary winding 616. These signals are applied to the ISNS pin of the UC 3852 which produces a variable frequency switching period on its output that drives the power switch 612.

Voltage feedback is developed from the 15 volt second stage signal 619. This output is fedback through an optoisolator 651 to the VFB pin of the controller 610. In this exemplary embodiment, the secondary 644 implements a linear regulator on the 5, 6.2 and 15 volt outputs (641, 643 and 645 respectively), although the two-stage architecture of the invention reduces the necessity of such regulators in certain applications. Here the regulators are used to achieve the required tolerances and to implement disabling of the outputs in the off mode.

Standby or suspend mode is implemented with a monostable one-shot that overrides the sensing circuits in the normal mode. The one-shot is activated with an optoisolator 630 used to detect the standby or suspend mode. When operating in this mode, the controller 610 switching frequency is fixed at, for example, 1 kHz. The 5 volt output is controlled by the error amplifier and PWM circuit in the UC3852.

It should be apparent that the foregoing embodiments are exemplary and are not intended to limit the scope of the invention. Partitioning a power supply to achieve high power factor correction and good line regulation on the output can be implemented in other embodiments. A power supply according to the principles of the invention assign low voltage requirements, such as suspend mode, to the power factor corrector stage and the high voltage requirements to the soft switching stage. This permits high power factor correction over a large range of input voltages and output voltages while still achieving the good output regulation and efficiency of a zero voltage switching topology.

What is claimed is:

1. A power supply for a multi-mode device comprising:
    a power factor corrector stage for providing a plurality of first stage voltages including a load regulator stage input voltage, the power factor corrector stage including a first feedback controller for regulating ones of the first stage voltages; and
    a load regulator stage powered by the load regulator stage input voltage and operable to provide a plurality of second stage voltages, the load regulator stage including a second feedback controller for regulating ones of the second stage voltages,
    wherein at least one of the first stage voltages supplies a voltage corresponding to a selected device mode and at least one of the second stage voltages supplies a voltage corresponding to another selected device mode.

2. The power supply of claim 1 wherein the power factor corrector stage is coupled to receive a primary voltage and wherein the load regulator stage input voltage has a magnitude between the primary voltage and the second stage voltage of highest magnitude.

3. The power supply of claim 1 wherein the first feedback controller is feedback responsive to one of the first stage output voltages.

4. The power supply of claim 1 wherein selected ones of the first stage voltages supply voltage requirements lower than the load regulator stage input voltage for the device.

5. The power supply of claim 1 wherein the second feedback controller is feedback responsive to one of the second stage voltages.

6. The power supply of claim 5 wherein the second feedback controller is feedback responsive to a second stage voltage feedback signal developed from a voltage of highest magnitude of the second stage voltages.

7. The power supply of claim 1 further comprising a mode detector for detecting a mode of the multi-mode device, the mode detector signaling the load regulator stage to assume a state corresponding to the detected mode.

8. The power supply of claim 1 wherein the power factor corrector stage comprises a zero voltage switching power supply.

9. The power supply of claim 1 wherein the load regulator stage comprises a soft switching power supply.

10. The power supply of claim 1 wherein the load regulator stage provides a run mode voltage.

11. A multi-mode monitor comprising a power supply,
    the power supply including:
        a power factor corrector stage for providing a plurality of first stage voltages including a load regulator stage input voltage wherein at least one of the first stage voltages supply voltage requirements lower than the load regulator stage input voltage for the monitor, the voltage requirements including a suspend mode voltage;
        a load regulator stage responsive to the load regulator stage input voltage and operable to provide a plurality of second stage voltages including a run mode voltage for the monitor; and
        a mode detector for selecting a monitor mode.

12. The monitor of claim 11 wherein the load regulator stage input voltage has a value between a maximum line voltage and the second stage voltage having a maximum value.

13. The monitor of claim 11 wherein the load regulator stage is feedback responsive to at least one of the second stage voltages.

14. The monitor of claim 11 wherein the load regulator stage is feedback responsive to a second stage voltage feedback signal developed from a voltage of highest magnitude of the second stage voltages.

15. The monitor of claim 11 wherein the power factor corrector stage comprises a zero voltage switching power supply.

16. The monitor of claim 11 wherein the load regulator stage comprises a soft switching power supply.

17. A method for powering a multi-mode monitor comprising the steps of:
    providing a power supply having a first stage and a second stage;
    in the first stage, supplying a plurality of power factor corrected output voltages, including a second stage input voltage and at least one monitor supply voltage corresponding to a mode of monitor operation;
    in the second stage, powering the second stage with the second stage input voltage and supplying at least another monitor supply voltage corresponding to another mode of monitor operation, wherein the at least another monitor supply voltage is turned off when the monitor is not in the corresponding mode; and
    selecting one of the corresponding monitor modes of operation.

* * * * *